(12) United States Patent
Flepp et al.

(10) Patent No.: US 6,684,239 B1
(45) Date of Patent: Jan. 27, 2004

(54) SYSTEM AND METHOD FOR AUTOMATICALLY PUBLISHING ELECTRONIC MAIL MESSAGES ON THE INTERNET

(75) Inventors: Beat Flepp, Tinton Falls, NJ (US); Lawrence David Jackel, Holmdel, NJ (US); Urs A Muller, Keyport, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/572,031

(22) Filed: May 16, 2000

(51) Int. Cl.[7] .............................................. G06F 15/16
(52) U.S. Cl. ........................................ 709/206; 709/246
(58) Field of Search ................................. 709/206, 203, 709/246; 715/500.1, 500

(56) References Cited

U.S. PATENT DOCUMENTS

| | | | | |
|---|---|---|---|---|
| 5,710,883 A | * | 1/1998 | Hong et al. .................. | 709/246 |
| 5,848,413 A | * | 12/1998 | Wolff ........................... | 707/10 |
| 5,961,590 A | * | 10/1999 | Mendez et al. .............. | 709/206 |
| 6,363,414 B1 | * | 3/2002 | Nicholls et al. .............. | 709/206 |
| 6,453,340 B1 | * | 9/2002 | Emura ........................ | 709/206 |
| 6,460,075 B2 | * | 10/2002 | Krueger et al. .............. | 709/206 |

OTHER PUBLICATIONS

David Bell, "Webmail: An Automated Web Publishing System" ASP Conf. Ser., vol. 172, Astronomical Data Analysis Software and Systems VIII, eds. D.M. Mehringer, R. L. Plante, & D.A. Roberts (San Francisco: ASP), 257.*

* cited by examiner

*Primary Examiner*—Mehmet B. Geckil

(57) ABSTRACT

The invention provides a system and method for publishing electronic mail messages on the Internet. A user selects an electronic mail message to be published and moves the selected electronic message to a designated folder. The electronic mail message is then processed to convert the electronic mail message into a format suitable for Internet publication. Once converted electronic mail message content is published on the Internet and accessible from any suitable browser software.

6 Claims, 5 Drawing Sheets

SYSTEM AND METHOD FOR AUTOMATICALLY PUBLISHING ELECTRONIC MAIL MESSAGES ON THE INTERNET

BACKGROUND OF THE INVENTION

The present invention relates to the Internet and, more particularly, to a method and system for automatically publishing electronic mail messages on the Internet.

Use of the Internet, and more specifically, the World Wide Web, has been gaining in popularity in the last several years. At the present time, almost every large corporation, university, government, organization, and many businesses around the world are connected to and have access to the Internet. Many individuals and households also have access to the Internet through a myriad of Internet Service Providers which provide an entrypoint to the Internet.

The World Wide Web provides the ability for a remote user to essentially share information to hundreds, thousands and even millions of other remote users around the world. Simply by sharing a simple Uniform Resource Locator (URL) or "link" to their Web page, a user can provide text, graphics, pictures, video, sound and other such content to anyone who has access to the World Wide Web. Generally, a Web page is a file on a computer system containing information for display or other presentation to a user. Web pages are typically written in hyper-text markup language (HTML) and contain references to associated text, graphics, and other multimedia files.

However, while most people have some familiarity with accessing Web pages and other Internet based utilities such as electronic mail, actually creating and publishing a Web page is still quite a difficult and complicated task for most individuals. The peculiarities and eccentricities of different server standards, file transfer protocols and procedures, Hypertext Markup Language (HTML) and an ever evolving array of technologies related to the Internet can make the task of creating and publishing a Web page quite onerous and time consuming.

Accordingly, it would be desirable to have a relatively simplistic and intuitive method and system for creating and publishing Web pages whereby a user can avoid having to learn and understand the many protocols and procedures for creating and publishing a Web page.

SUMMARY OF THE INVENTION

The present invention provides a system and method for publishing electronic mail messages on the Internet via a designated electronic mail message repository provided in a user's electronic mail facility. One embodiment of the method of the present invention includes the steps of providing a designated repository for electronic mail messages that a user wants to be published on the Internet, receiving an electronic mail message in the designated repository, processing the electronic mail message into an Internet readable format and then publishing the electronic mail message on the Internet.

In one embodiment of the present invention, the designated repository is an electronic mail message folder. A user selects an electronic mail message and moves the electronic mail message to the designated repository. The electronic mail message is processed by converting the electronic mail message into an Internet readable format such as into an HTML format. The electronic mail message is then published on the Internet and made publicly available.

In an exemplary system of the present invention, the system includes an electronic mail facility, an electronic mail server, an electronic mail message processor and a Web server. The electronic mail facility provides users with capabilities such as sending, receiving and storing electronic mail messages. Through the electronic mail message facility, the user is able to select one or more electronic mail messages that the user wishes to be published on the Internet. The electronic mail message facility preferably includes a designated repository into which the user selected electronic mail message may be placed. This repository may be an actual separate directory or folder or simply a virtual repository into which the electronic mail is placed. Once in this designated repository, the electronic mail message is processed by the electronic mail message processor which converts the electronic mail message into a format suitable for publication on the Internet. The converted electronic mail message is then published on the Internet via the Web server.

DETAILED DESCRIPTION OF THE INVENTION

Figure 1:
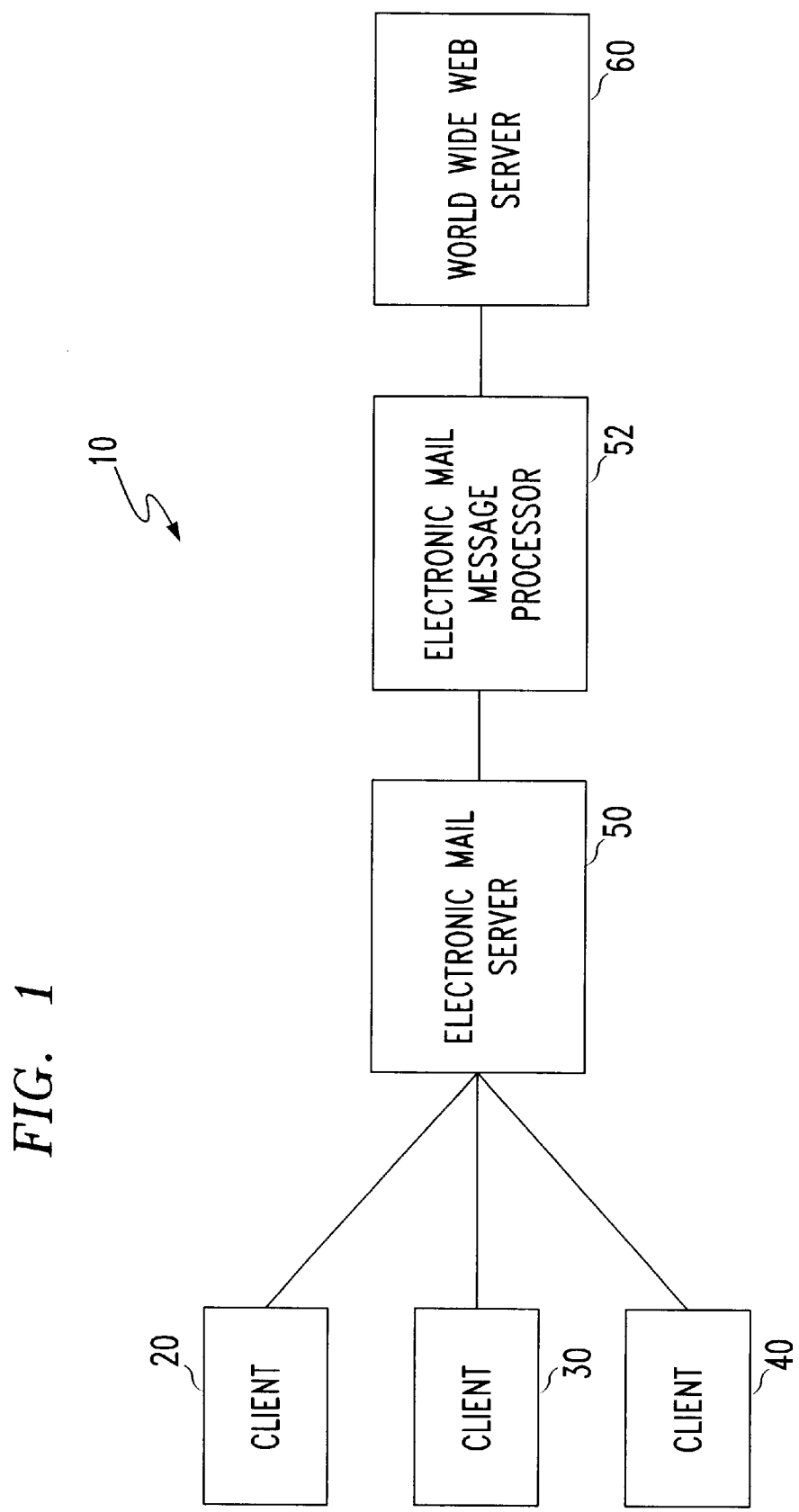
FIG. 1 illustrates an exemplary system in accordance with the teachings of the present invention.

Referring to FIG. 1, an electronic mail message Internet publishing system 10 for automatically publishing electronic mail messages on the Internet is shown. The electronic mail message Internet publishing system 10 includes a number of clients or users 20, 30 and 40 which are in communication with a electronic mail server 50. The electronic mail server 50 is in further communication with an electronic mail message processor 52 which processes electronic mail messages for publication as specified by one or more of the users. While this embodiment of the present invention is described and illustrated herein as an electronic mail message Internet publishing system having one electronic mail server, the present invention may easily be implemented with two or more electronic mail servers in a distributed system. In this manner, electronic mail server 20 may be connected via an inter-electronic mail message network to other electronic mail servers, not shown, in the electronic mail message Web publishing system 10. Thus, each electronic mail server would be able to communicate (e.g., transmit and receive information) with the other electronic mail servers in the electronic mail network system.

Referring again to FIG. 1, the electronic mail message server 50 is in communication with at least one World Wide Web server 60 which is accessible via the Internet. In an embodiment of the present invention, any one of the clients 20, 30 and 40 selects an electronic mail message the client wishes to publish on the Internet and places the electronic mail message in a designated receptacle or folder provided on the electronic mail message server 50. The electronic mail message processor 52 then processes the electronic mail message and transmits the electronic mail message to the Web server 60 for publication on the Internet as a World Wide Web page.

The present invention provides an extremely intuitive and easy way for any client to publish information on the Internet since the client only has to know how to use electronic mail to publish information on the Internet. The electronic mail message processor 52 performs the more difficult tasks associated with publishing information on the Internet such as converting the electronic mail message to an Internet ready file format such as an HTNL format file (.html) and additionally, the electronic mail message processor 52 performs the required file transfer of the HTML file to the Web server. Of course, such tasks may be separately performed by the user employing, for example, an HTML editor and a File Transfer Protocol (FTP) utility, however, the present invention relieves the user from having to perform these tasks themselves. The user simply has to designate an electronic mail message to be published on the Internet by selecting the electronic mail message and transferring the message to a designated repository, as discussed in more detail later herein.

Figure 2:
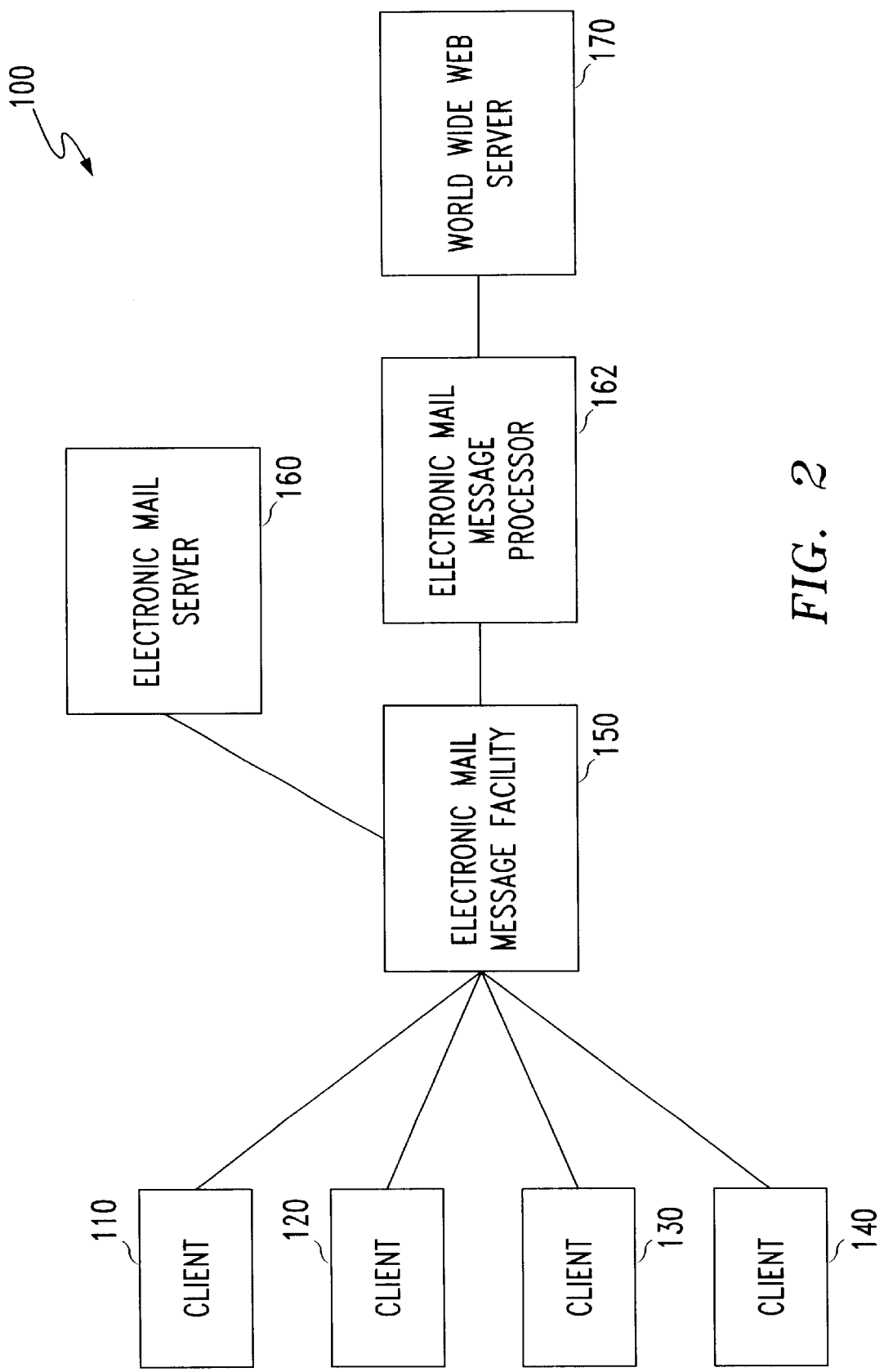
FIG. 2 illustrates another exemplary system in accordance with the teachings of the present invention.

Referring to FIG. 2, another embodiment of the present invention is shown. In this embodiment, the system 100 includes a number of clients 110, 120, 130 and 140 which interface with an electronic mail message facility 150. In one embodiment, the electronic mail message facility 150 may be software which resides locally at each client's site, such as on their personal computer. Alternatively, the electronic mail message facility 150 may be provided centrally such as via an Internet based electronic mail message facility which is accessible through browser software on the client's computer. The electronic mail message facility 150 is in communication with an electronic mail server 160 and an electronic mail message processor 162. The electronic mail message processor 162 is responsible for converting any electronic mail messages designated by the user for publication into an Internet ready format, such as a Web page format. Once converted, the electronic mail message, now in a Web page format, is transferred to a Web server 170 for publication on the Internet. Preferably, the transfer of the electronic mail message to the Web server is also performed by the electronic mail message processor 162.

Figure 3:
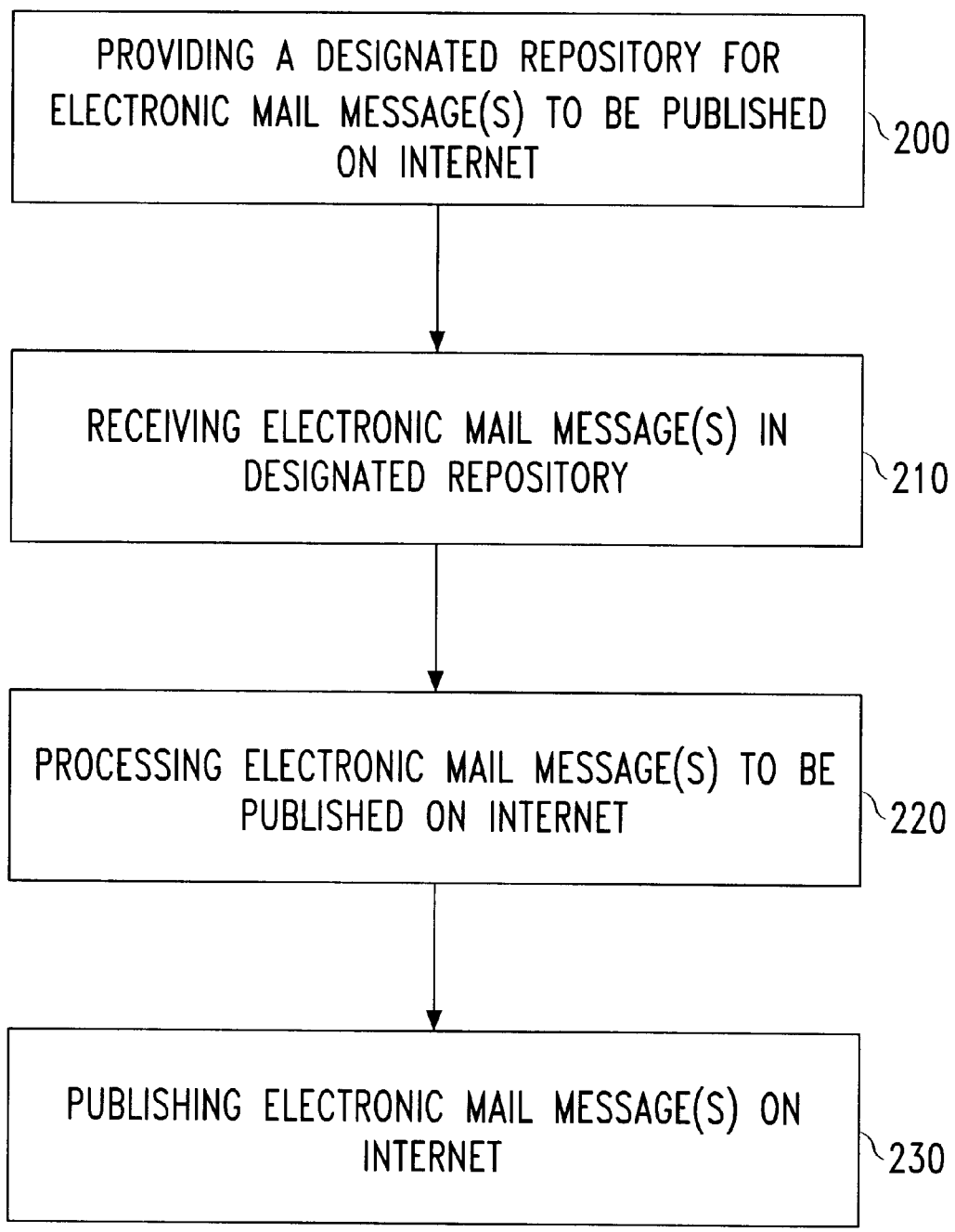
FIG. 3 illustrates an exemplary method in accordance with the teachings of the present invention.

An exemplary method of the present invention is shown in FIG. 3. In the present method, a designated repository is provided for any electronic mail messages a user wishes to be published on the Internet, step 200. The designated repository may be any one of an electronic mail message folder, a directory, or other location designated for electronic mail messages to be published. The designated repository may be provided by, for example, the electronic mail service or facility provider through the user's electronic mail message facility or software. The method of the present invention further includes the step of receiving an electronic mail message in the designated repository, step 210. Typically, the electronic mail message is placed into the designated repository by a user wishing to publish the electronic mail message. Once an electronic mail message is received in the designated repository, the electronic mail message is processed, step 220, which may include converting the electronic mail message into a World Wide Web format. Once the electronic mail message is processed, the processed electronic mail message is published on the Internet, step 230.

In the present invention, the electronic mail message processor is activated by the placement of an electronic mail message in the designated repository. The designated repository may be located in any number of locations, such as on a local user's machine, on the electronic mail server or other network. In the present invention, any electronic mail message placed in the to designated repository will be contemporaneously processed and published on the Internet as soon as the electronic mail message is placed within the designated repository. Other possible system configuration are possible such as having the system, such as through the electronic mail message processor, poll or scan the designated repository intermittently to determine if any electronic mail messages exist in the designated repository. In an exemplary embodiment, the electronic mail message processor may be implemented as software provided by the electronic mail service provider on a machine, such as a computer which interfaces and communicates with either a user's electronic mail server or electronic mail message facility. The electronic mail message processor may include the functionality provided by conventional HTML editors and FTP utilities and may includes routines for converting the electronic mail message into an Internet readable format, as described in more detail later herein.

Figure 4:
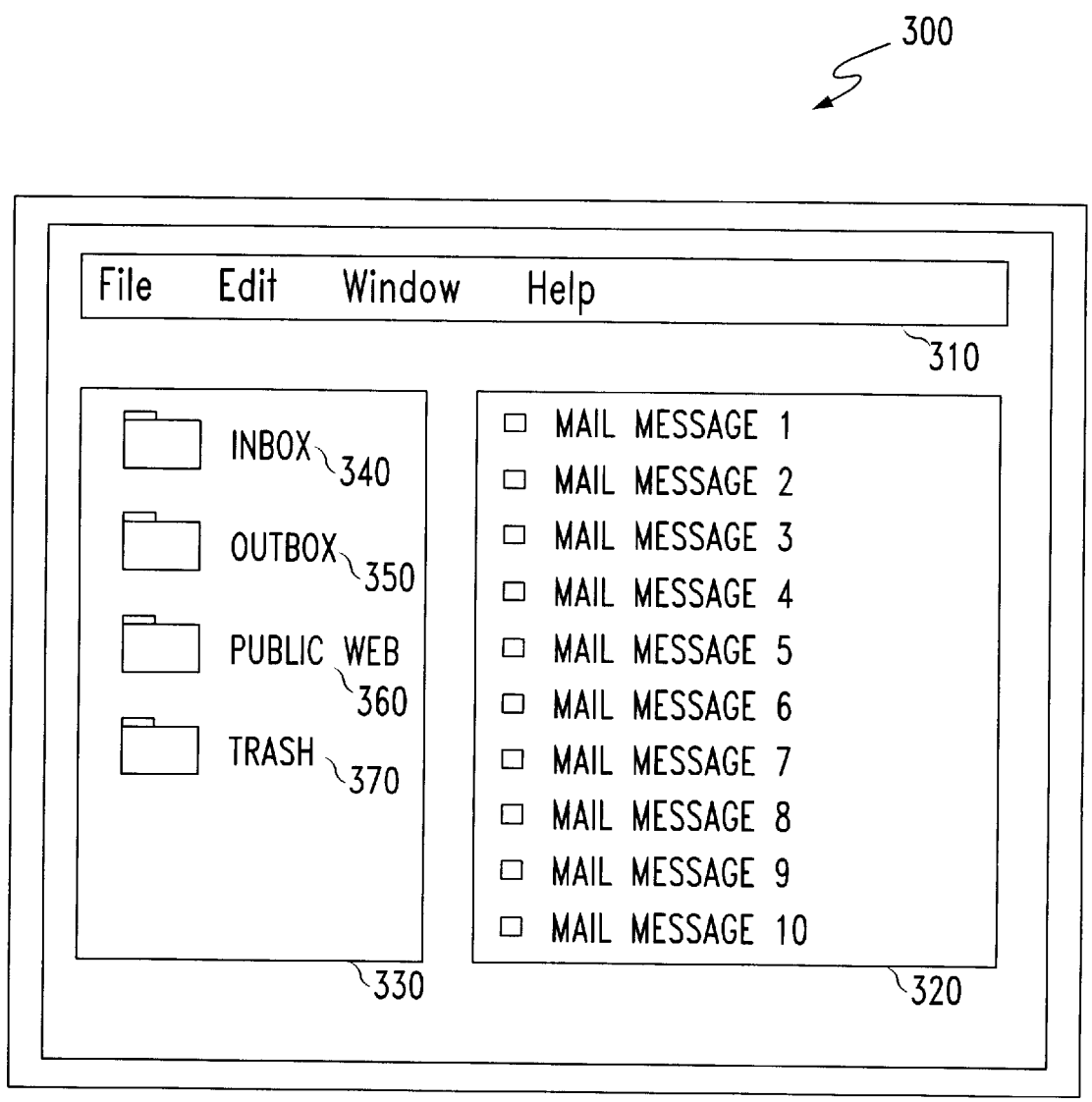
FIG. 4 illustrates an exemplary user screen in accordance with the teachings of the present invention.

In the present invention, via the user's electronic mail message facility, such as their electronic mail software, a user may identify or designate one or more electronic mail messages to be published on the Internet; or more specifically, the World Wide Web. Referring to FIG. 4, an exemplary user screen 300 for identifying or designating one or more electronic mail messages to be published on the Internet is shown. In this embodiment, the exemplary user screen 300 includes a user menu 310, a message summary section 320 and a user folder section 330 which may include folders such as an inbox folder 340, an outbox folder 350, a Public Web folder 360 and a trash folder 370. Typically, a user's new incoming messages will be placed in the user's inbox folder 340, outgoing messages are placed in the user's outbox folder 350 and unwanted messages are placed in the trash folder 370 for discarding. The Public Web folder 360 is designated as a repository for electronic mail messages the user wishes to be published on the Internet. Of course, other additional folders may be provided or created within the user screen 300, as well as other folder naming conventions, provided at least one folder is provided, such as the Public Web folder, for receiving electronic mail messages the user wishes to be published on the Internet.

In designating electronic mail messages to be published on the Internet, the user may simply highlight an electronic mail message within the message summary section 320 and then place the highlighted electronic mail message into the designated publication folder, such as the Public Web folder 360 in the user folder section 330. Such an action may be performed with a user control device such as a mouse, keyboard or other cursor controlling device by a conventional "Click and Drag" action. In an alternative embodiment, a separate button is provided on the user screen for transferring a selected electronic mail message to the Public Web folder. In this embodiment, the user simply selects or highlights the electronic mail message to be published within the message summary section 320 and then presses the separate button which will transfer the electronic mail message to the Public Web folder. In an exemplary embodiment, placing or moving an electronic mail message into the Public Web folder will simply place a "copy" of the electronic mail message into the Public Web folder and the "original" of the electronic mail message will remain, for example, in the originating folder, such as the user's inbox folder.

It is contemplated that utilizing the present invention a user may simply take any electronic mail message they have received and publish the information contained in the electronic mail message by placing the electronic mail message into the designated repository, such as the Public Web folder discusses above. However, at times the user will wish to publish information such as text, pictures, video, audio or other files which the user did not receive as an electronic mail message from a third party. In such a case, the user will simply have to create an electronic mail message with the content they wish to publish and send "themselves" the electronic mail message to their own electronic mail message account. Such content may be included in the body of an electronic mail message or attached to the electronic mail message as is known in the art. Such attachment files may be of any form such as Jpeg's, Mpeg's, GIFs, TIFFs, WAVs, RAs or other files. Multiple files may also be attached to a single electronic mail message.

Figure 5:
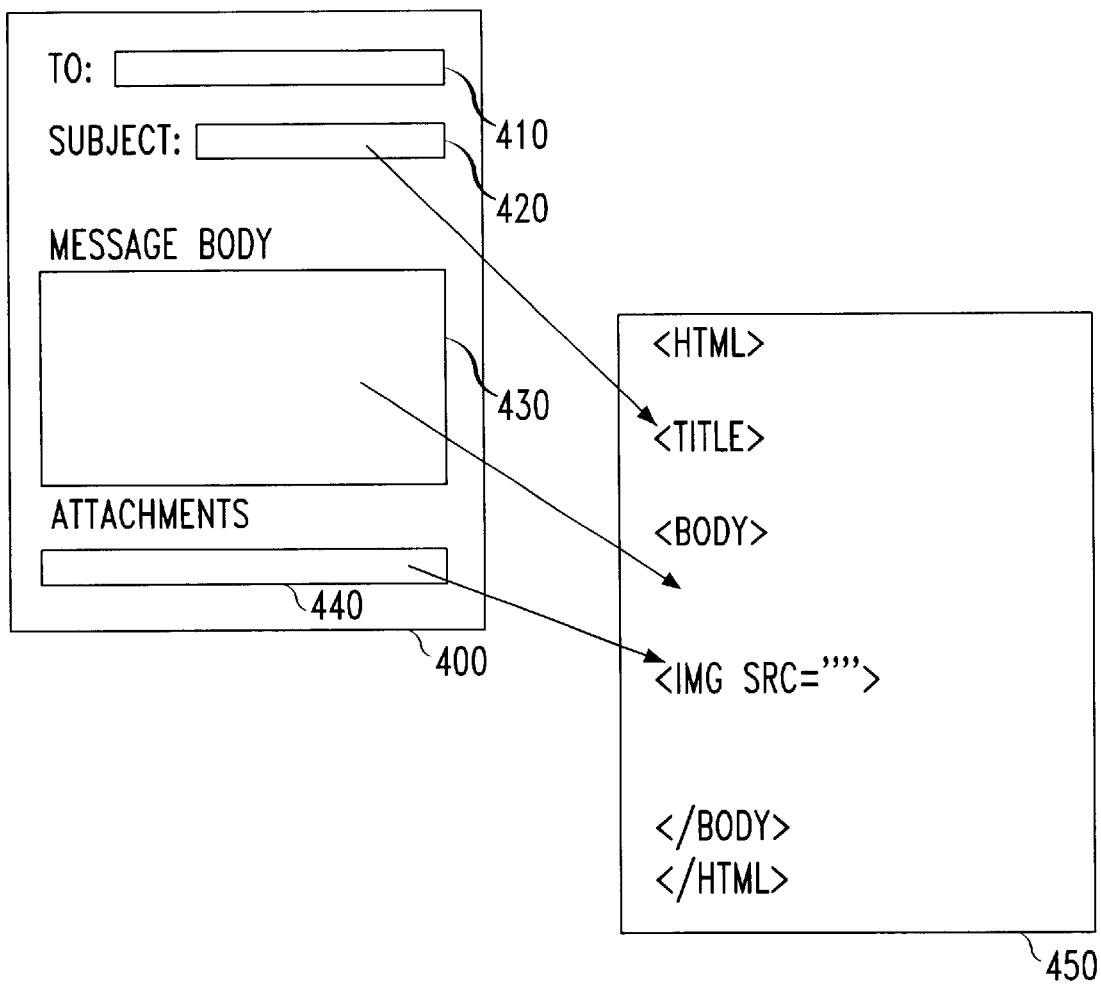
FIG. 5 illustrates an exemplary conversion of an electronic mail message into a World Wide Web format in accordance with the teachings of the present invention.

An exemplary method for converting an electronic mail message into a Web page format is shown in FIG. 5. In one embodiment of the present invention, the electronic mail message may be parsed such that certain portions of the electronic mail message are extracted and tagged with appropriate HTML tags or other similar identifiers. As shown in FIG. 5, a typical electronic mail message 400 includes a "TO") section 410, a "SUBJECT" section 420, a "MESSAGE BODY" section 430 and an "ATTACHMENTS" section 440. The sections of the electronic mail message are processed by the electronic mail message processor such that sections 420, 430 and section 440 are tagged for conversion of the electronic mail message into a format suitable for publication on the World Wide Web, such as a Web page file format 450. In one embodiment, any text within the SUBJECT section 420 is converted into the <TITLE> portion of the Web page, any text within the MESSAGE BODY section 430 is converted into the <BODY> portion of the Web page and any attachments, such as pictures, may be included as image files within the <BODY> portion of the Web page. Once conversion is completed, the converted web page file is saved, such as with a .HTML extension and transferred to a Web server for publication.

In another embodiment of the present invention, the user may provide certain format preferences within the electronic mail message. For example, if a user has two or more images attached to an electronic mail message and the user wants to display the images side by side on the user's Internet Web page, the user will simply place the words "Side By Side" within quotes in the body section of the electronic mail message. Any number of format options or format rule sets may be provided for the user to specify within their electronic mail messages. It is conceivable that such format specifier may be placed in any part of the electronic mail message, such as in the "SUBJECT" section or even as a separate attachment to the electronic mail message. For example, the user may be able to create a simple text file which includes the user's format preferences for publishing the electronic mail message. The electronic mail message processor will process the attached text file and format the user's published electronic mail message according to the user's preferences within the attached text file.

In the present invention, a user may "unpublish" or remove the electronic mail message content from access on the Web simply by reversing the process disclosed herein for publishing the electronic mail message. In one embodiment, a user may simply remove the electronic mail message from the designated repository or folder to "unpublish" that electronic mail message. Once the system detects that the user has deleted or removed an electronic mail message from the designated repository, the Web page corresponding to that respective electronic mail message will be deleted, for example, from the Web server hosting the Web page. The deletion process may be performed by the electronic mail message processor which may send a command to the Web server to delete the Web page associated with that electronic mail message.

It will be apparent to those skilled in the art that many changes and substitutions can be made to the system and method described herein without departing from the spirit and scope of the invention as defined by the appended claims. For example, the designated repository or folder described herein may include additional sub-repositories or directories which the user may create within the main designated repository or folder. In this manner, the user may easily organize their electronic mail messages which have been published on the Internet. In one embodiment, separate Web pages may be created for each individual electronic mail message within the designated repository or sub-repository or alternatively, a single Web page may be created and every new electronic mail message content being appended to the single existing Web page.

We claim:

1. A method for automatically publishing a user's electronic mail messages on the Internet, the method comprising:

providing a designated repository for one or more electronic mail messages;

receiving an electronic mail message in the designated repository;

processing the electronic mail message in the designated repository by converting the content in the electronic mail message to a Web format such that separate portions of the message are extracted and tagged with appropriate Web format identifiers; and publishing the processed electronic mail message on the Internet.

2. The method of claim 1, wherein the designated repository is an electronic mail message folder.

3. The method of claim 2, wherein the electronic mail message folder is provided on an electronic mail message server.

4. The method of claim 1, wherein the Web format is an HTML format.

5. The method of claim 1, wherein publishing the electronic mail message on the Internet includes copying the processed electronic mail message to a Web server.

6. The method of claim 1, wherein a user may unpublish an electronic mail message by removing the electronic mail message from the designated repository.

\* \* \* \* \*